United States Patent
Hasegawa et al.

(10) Patent No.: US 9,745,441 B2
(45) Date of Patent: Aug. 29, 2017

(54) GRAPHENE COMPOSITION AND GRAPHENE MOLDED ARTICLE

(71) Applicant: GRAPHENE PLATFORM CORPORATION, Tokyo (JP)

(72) Inventors: Shoji Hasegawa, Tokyo (JP); Nagisa Kamiya, Tokyo (JP)

(73) Assignee: GRAPHENE PLATFORM CORPORATION (JP)

(*) Notice: Subject to any disclaimer, the term of this patent is extended or adjusted under 35 U.S.C. 154(b) by 0 days.

(21) Appl. No.: 14/432,724

(22) PCT Filed: May 30, 2014

(86) PCT No.: PCT/JP2014/064531
§ 371 (c)(1),
(2) Date: Mar. 31, 2015

(87) PCT Pub. No.: WO2015/181982
PCT Pub. Date: Dec. 3, 2015

(65) Prior Publication Data
US 2017/0066897 A1    Mar. 9, 2017

(51) Int. Cl.
*H01B 1/24* (2006.01)
*H01B 1/04* (2006.01)
(Continued)

(52) U.S. Cl.
CPC .............. *C08K 3/04* (2013.01); *C08J 3/226* (2013.01); *C08J 5/18* (2013.01); *C09C 1/44* (2013.01);
(Continued)

(58) Field of Classification Search
CPC ........ H01B 1/24; H01B 1/04; C01B 31/0484; C01B 31/0438; B82Y 30/00; B82Y 40/00
(Continued)

(56) References Cited

U.S. PATENT DOCUMENTS 7,892,455 B2    2/2011    Bradley et al. ............... 252/511
8,978,812 B2    3/2015    Kimura et al. ............... 180/326
(Continued)

FOREIGN PATENT DOCUMENTS

JP    2005182002    7/2005    .............. C08K 3/04
JP    2006508221    3/2006    .............. C08J 3/22
(Continued)

OTHER PUBLICATIONS

Smith ("Lateral size selection of surfactant-stabilised graphene flakes using size exclusion chromatography." CPL, 531, pp. 169-172, pub Feb. 17, 2012).*
(Continued)

*Primary Examiner* — Tri V Nguyen
(74) *Attorney, Agent, or Firm* — Hayes Soloway P.C.

(57) ABSTRACT

There are provided a graphene composition and a graphene molded article that exert the properties, such as the strength, due to graphene mixed therein, even with a small amount of the graphene. The graphene composition contains a compound, graphene, and a dispersant, the graphene is contained in an amount of from 0.01 to 5% by weight and contains first flakes having a longer edge of less than 1 μm and second flakes having a longer edge of 1 μm or more and less than 5 μm, a number of the first flakes is 5% or more of the entire flakes in the graphene, and a total number of the first flakes and the second flakes is 90% or more of the entire flakes in the graphene.

9 Claims, 9 Drawing Sheets

(51) Int. Cl.

| | |
|---|---|
| *B82Y 30/00* | (2011.01) |
| *C08K 3/04* | (2006.01) |
| *C08J 3/22* | (2006.01) |
| *C08J 5/18* | (2006.01) |
| *C09C 1/44* | (2006.01) |
| *C09C 3/08* | (2006.01) |

(52) U.S. Cl.
CPC ............. *C09C 3/08* (2013.01); *H01B 1/04* (2013.01); *H01B 1/24* (2013.01); *C08J 2323/06* (2013.01); *C08J 2325/06* (2013.01); *C08J 2363/00* (2013.01); *C08J 2423/06* (2013.01); *C08K 2201/001* (2013.01)

(58) Field of Classification Search
USPC .............. 252/510, 511, 500, 502; 106/31.13; 977/753, 788
See application file for complete search history.

(56) References Cited

U.S. PATENT DOCUMENTS

| | | | |
|---|---|---|---|
| 2005/0118421 A1 | 6/2005 | Ashibe et al. ................ 428/364 |
| 2006/0226572 A1 | 10/2006 | Tanaka et al. .............. 264/176.1 |
| 2010/0000441 A1* | 1/2010 | Jang ..................... C09D 11/037 106/31.13 |
| 2010/0201023 A1 | 8/2010 | Piccione et al. ................ 264/117 |
| 2012/0270960 A1* | 10/2012 | Felisari .................. B82Y 30/00 521/90 |
| 2013/0015409 A1 | 1/2013 | Fugetsu ........................ 252/500 |
| 2013/0240799 A1 | 9/2013 | Haeger et al. ................ 252/511 |
| 2013/0251619 A1* | 9/2013 | Rikihisa ................. B82Y 30/00 423/447.2 |
| 2015/0073082 A1 | 3/2015 | Mukohata et al. ........... 524/427 |

FOREIGN PATENT DOCUMENTS

| | | | | |
|---|---|---|---|---|
| JP | 2006313308 | 11/2006 | ............ B29C 55/28 |
| JP | 2010540687 | 12/2010 | ................ C08J 3/22 |
| JP | 2013086993 | 5/2013 | ............ C01B 31/02 |
| JP | 2013194239 | 9/2013 | ................ C08J 3/22 |
| WO | WO2011074125 | 6/2011 | ............ C01B 31/02 |
| WO | WO2013051609 | 4/2013 | ............ B62D 25/08 |
| WO | WO2013141058 | 9/2013 | ................ C08K 3/04 |
| WO | WO2013146213 | 10/2013 | ................ C08K 3/04 |

OTHER PUBLICATIONS

International Search Report (no translation) issued in application No. PCT/JP2014/064531, dated Jul. 17, 2014 (11 pgs).

Lotya et al., "Liquid Phase Production of Graphene by Exfoliation of Graphite in Surfactant/Water Solutions," J. Am. Chem. Soc., 2009, vol. 131, No. 10, pp. 3611-3620 (10 pgs).

Wan et al., "Improved dispersion and interface in the graphene/epoxy composites via a facile surfactant-assisted process," Composites Science and Technology, 2013, vol. 82, pp. 60-68 (9 pgs).

Guardia et al., "High-throughput production of pristine graphene in an aqueous dispersion assisted by non-ionic surfactants," Carbon 49, 2011, pp. 1653-1662 (10 pgs).

Japanese Office Action (w/translation) issued in application 2014-532139, dated Feb. 3, 2015 (6 pgs).

Decision to Grant a Patent (w/translation) issued in application 2014-532139, dated Mar. 10, 2015 (6 pgs).

International Preliminary Report on Patentability issued in application No. PCT/JP2014/064531, dated Dec. 15, 2016 (10 pgs).

* cited by examiner

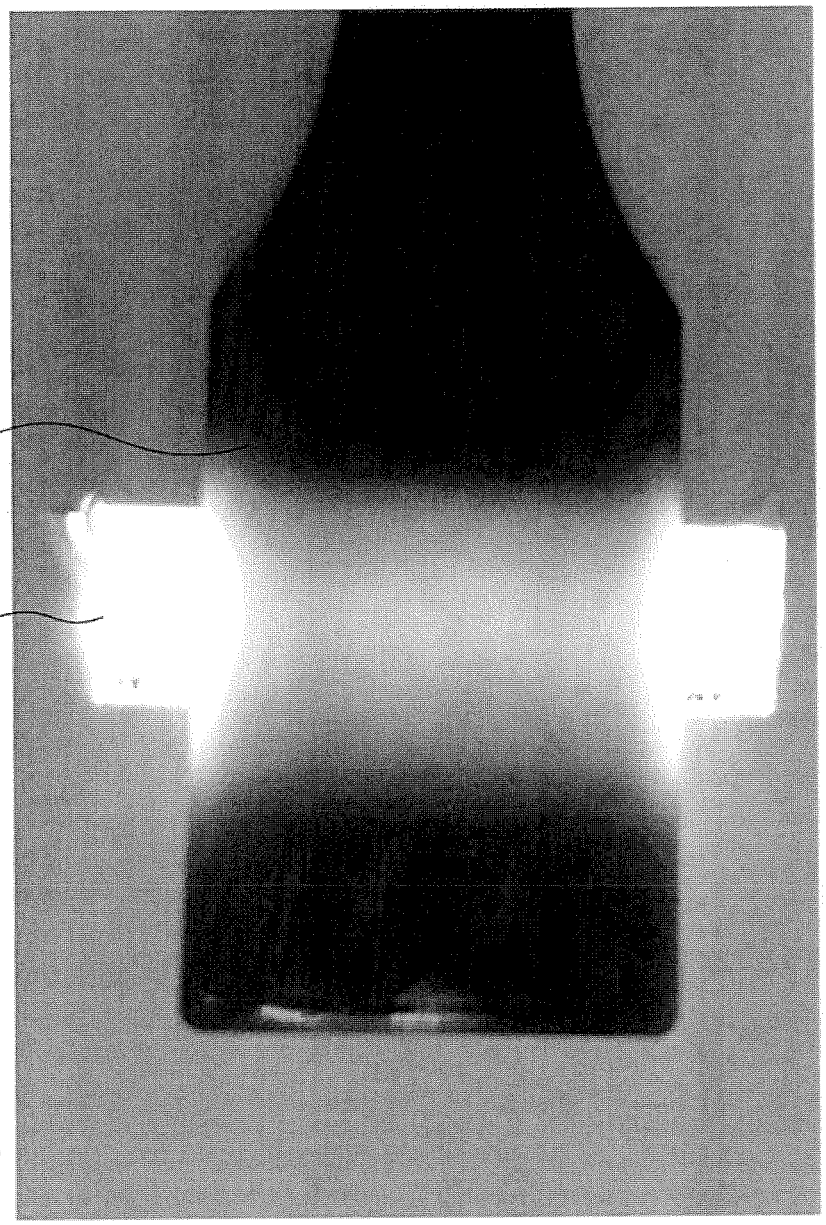

GRAPHENE COMPOSITION AND GRAPHENE MOLDED ARTICLE

TECHNICAL FIELD

The present invention relates to a graphene composition and a graphene molded article each having graphene mixed therein.

BACKGROUND ART

In recent years, graphene is being studied actively. For example, Patent Literature 1 describes a molded article containing a polycarbonate resin having graphene sheets and a phosphate ester mixed therein. There is described that the fire retardancy and the dispersibility of graphene sheets are enhanced with the phosphate ester to form a composite material of a polycarbonate resin having graphene mixed therein, with which a molded article having such properties as electroconductivity, fire retardancy, rigidity and the like is provided. Patent Literature 1 describes that the graphene sheets have a thickness of from 1 to 10 nm and a size of from 1 to 30 μm.

Patent Literature 2 describes that a thermoplastic resin is mixed with graphene sheets and an inorganic filler to provide a molded article having a high elastic modulus. The graphene sheets are added in an amount of from 0.1 to 40 parts by mass per 100 parts by mass of the thermoplastic resin and has an average particle diameter of from 0.1 to 50 μm and of 5 μm in the example.

Patent Literature 3 describes the use of graphene in the form of a master batch (intermediate composition). Patent Literatures 4 to 6 show the use of carbon fibers and carbon nanotubes (CNT) in the form of a master batch.

CITATION LIST

Patent Literature

Patent Literature 1: WO 2013/141058 (paragraphs 0034, 0035 and 0041)
Patent Literature 2: WO 2013/146213 (paragraphs 0022-0023 and 0041)
Patent Literature 3: JP-A-2013-194239 (paragraphs 0016 and 0044)
Patent Literature 4: JP-T-2006-508221 (paragraph 0061)
Patent Literature 5: JP-T-2010-540687 (paragraphs 0016 and 0044)
Patent Literature 6: WO 2013/051609 (claim 1)

SUMMARY OF INVENTION

Technical Problem

It has been known that a composition containing a compound having graphene mixed therein is enhanced in such properties as strength, electroconductivity and the like. It has also been known from the research articles that the properties are enhanced only with a small amount of graphene. However, Patent Literature 1 describes that the substantial amount of 5% by weight or less thereof exerts no effect, in view of the examples. Patent Literature 2 describes that the properties, such as the elastic modulus, are not sufficiently enhanced with a small amount thereof mixed.

Patent Literature 3 describes in detail that carbon nanotubes are mixed in an intermediate composition, but does not described a specific constitution for graphene. Patent Literatures 4 to 6 do not describe graphene mixed.

The invention has been made in view of the problems, and an object thereof is to provide a graphene composition and a graphene molded article that exert the desired properties, such as the strength, due to graphene having a prescribed grain size mixed therein, even with a small amount of the graphene.

Solution to Problem

For solving the problem, the graphene composition of the invention may have a feature that:

the graphene composition contains a compound, graphene, and a dispersant, the graphene is contained in an amount of from 0.01 to 5% by weight and contains first flakes having a longer edge of less than 1 μm and second flakes having a longer edge of 1 μm or more and less than 5 μm, a number of the first flakes is 5% or more of the entire flakes in the graphene, and a total number of the first flakes and the second flakes is 90% or more of the entire flakes in the graphene.

According to the feature, the graphene mixed is in an amount of from 0.01 to 5% by weight and contains the first flakes having a longer edge of less than 1 μm and the second flakes having a longer edge of 1 μm or more and less than 5 μm, and thereby the properties of the graphene composition may be the desired properties only with a small amount of graphene mixed therein. Furthermore, it is considered that the influence of the graphene on the inherent characteristics of the compound may be small since the amount of the graphene mixed therein is small.

The properties of the graphene composition referred herein include the mechanical properties, such as the tensile strength and the elastic modulus, and the like. The addition of the graphene to the compound may enhance the mechanical properties of the graphene composition, such as the tensile strength and the elastic modulus, and thereby the graphene composition may have the desired properties. The inherent characteristics of the compound mean the advantageous properties inherent to the compound, and for example, in the case where the compound is a resin, the moldability inherent to the resin, and the light weight. The unit, percentage by weight, as the proportion of the graphene mixed is based on the total weight of the graphene composition.

The graphene composition of the invention may have a feature that:

in the graphene, the number of the first flakes is larger than the number of second flakes.

According to the features, the number of the small first flakes having a longer edge of less than 1 μm is larger, by which the dispersibility of the graphene may be improved, and the graphene composition may have the desired properties only with a small amount of the graphene mixed therein.

The graphene composition of the invention may have a feature that:

the graphene contains third flakes having a thickness of more than 1.3 nm (which corresponds to four or more layers of graphene since one layer of graphene has a thickness of 0.34 nm) and 100 nm or less in a number of more than 60% of the entire flakes in the graphene.

According to the feature, the amount of graphene having a thickness of 1.3 nm or more, i.e., four or more layers, is large, and thus the graphene is easily produced and is suitable for mass production, as compared to one-layer, two-layer or three-layer graphene.

The third flakes herein are defined by the thickness, and thus there are cases where flakes that correspond to the first flake or the second flake may have a size that is defined as the third flakes. For example, there are cases where the first flakes having a longer edge of less than 1 μm may have a thickness of 10 nm and thus may correspond to the third flakes.

The graphene composition of the invention may have a feature that:

the compound is an organic compound having an average molecular weight of from 10,000 to 1,000,000.

According to the feature, many of the first flakes have a longer edges that is shorter than the outer diameter of the cluster of the minimum unit of the molecule of the organic compound, whereas many of the second flakes have a longer edges that is longer than the outer diameter of the cluster of the minimum unit of the molecule of the organic compound, and thus the graphene may impart favorable properties of the composition. The compound is preferably an organic compound having an average molecular weight of from 20,000 to 300,000.

The graphene composition of the invention may have a feature that:

the graphene is contained in an amount of less than 0.1% by weight.

According to the feature, the amount of the graphene mixed therein is small, and thus there is a less possibility of impairing the properties inherent to the compound. For example, on molding the graphene compound into a final product, the content of the graphene is less than 0.1% by weight, by which the desired properties of the graphene composition, such as the strength, achieved by the graphene may be exerted while retaining the characteristics inherent to the compound as similar to the ordinary materials.

The graphene composition of the invention may have a feature that:

the dispersant is a nonionic surfactant.

According to the feature, the use of the nonionic surfactant may enhance the dispersibility of the graphene.

The graphene composition of the invention may have a feature that:

the dispersant is a compound having a glycerine fatty acid ester structure.

According to the feature, the use of the compound having a glycerine fatty acid ester structure may enhance the exfoliation and the dispersibility of the graphene.

The graphene composition of the invention may have a feature that:

the graphene composition contains a compound, graphene, and a dispersant, the graphene is contained in an amount of from 0.01 to 5% by weight and contains first flakes having a longer edge of less than 1 μm, and the dispersant is a nonionic surfactant.

According to the feature, the use of the nonionic surfactant may enhance the dispersibility of the flakes of the graphene.

The graphene composition of the invention may have a feature that:

the graphene composition contains a compound, graphene, and a dispersant, the graphene is contained in an amount of from 0.01 to 5% by weight and contains first flakes having a longer edge of less than 1 μm, and the dispersant is a glycerine fatty acid ester.

According to the feature, the use of the glycerine fatty acid ester may enhance the dispersibility of the flakes of the graphene.

The molded article of the invention may have a feature that:

the molded article is formed by molding the graphene composition into a final product.

According to the feature, a molded article that is excellent in strength may be provided.

The graphene composition may be molded in such a manner that the graphene composition as an intermediate composition is diluted with a base composition and then molded, or the graphene composition may be directly molded.

BRIEF DESCRIPTION OF DRAWINGS

FIG. 9 is an image obtained by imaging the molded article irradiated with light from below in Example 8.

DESCRIPTION OF EMBODIMENTS

Figure 1:
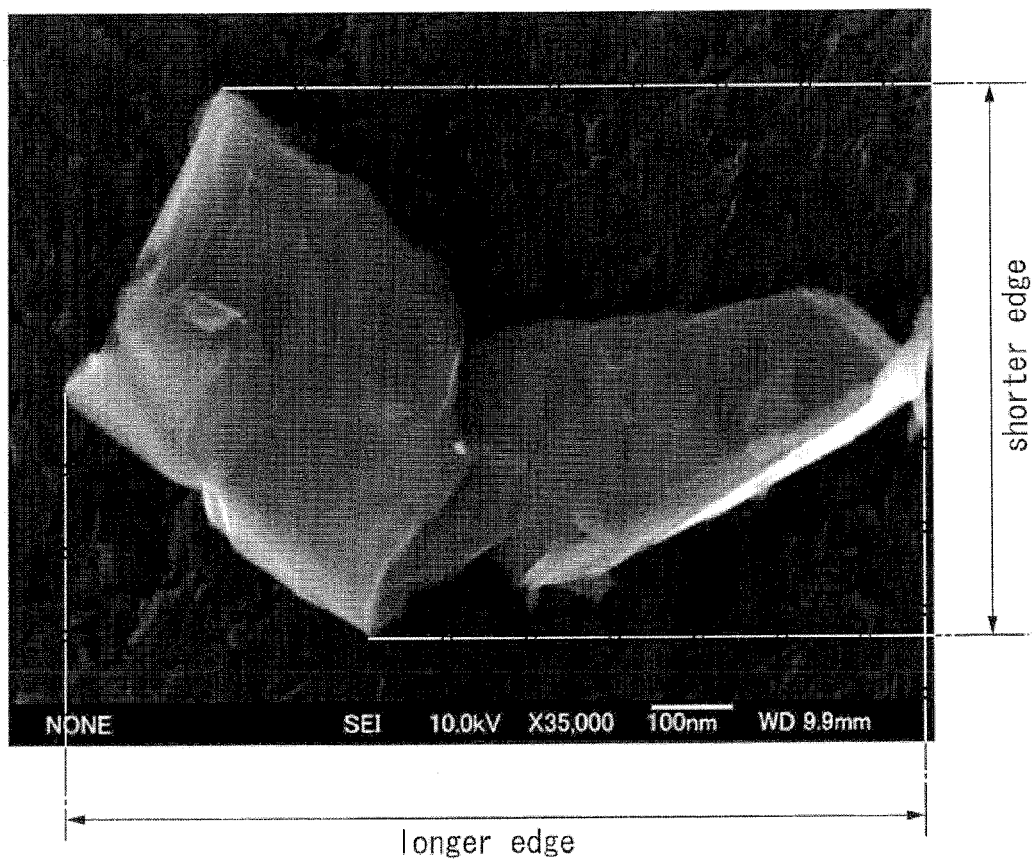
FIG. 1 is an image obtained by imaging graphene in the form of flakes with a scanning electron microscope (SEM).

The graphene composition and the graphene molded article of the invention will be described below. The compound, the graphene and the dispersant will be described, and then the graphene composition will be described.

Compound

Examples of the compound include a synthetic resin, a mineral oil, and an organic solvent.

Synthetic Resin

Examples of a thermoplastic resin as the synthetic resin include polyethylene (PE), polypropylene (PP), polystyrene (PS), polyvinyl chloride (PVC), an ABS resin (ABS), an acrylic resin (PMMA), polyamide (nylon) (PA), polyacetal (POM), polycarbonate (PC), polyethylene terephthalate (PET), cyclic polyolefin (COP), polyphenylene sulfide (PPS), polytetrafluoroethylene (PTFE), polysulfone (PSF), polyamideimide (PAI), thermoplastic polyimide (PI), polyether ether ketone (PEEK), and a liquid crystal polymer (LCP). Examples of a thermosetting resin as the synthetic resin include an epoxy resin (EP), a phenol resin (PF), a melamine resin (MF), polyurethane (PUR), and an unsaturated polyester resin (UP).

Examples of the major applications of the synthetic resins include a shampoo bottle, a chemical bottle, a disposal bag, a plastic shopping bag, and a chemical resistant bottle for polyethylene (PE); a chassis of a home electrical appliance or the like, a bumper of an automobile, a carrier bag for polypropylene (PP); expanded polystyrene, a food tray, and a CD case for polystyrene (PS); a water pipe, a rainwater pipe, a hose pipe, and an infusion bottle for polyvinyl chloride (PVC), a suitcase and a helmet for an ABS resin (ABS); an aquarium, a display device, and a display of a meter gauge for an acrylic resin (PMMA); a PET bottle, a lid of a food tray, and a cosmetic bottle for polyethylene terephthalate (PET); a gear wheel, a bearing, and a fishing net for nylon (PA); and a cabinet, a lens, and various container for polycarbonate (PC).

The synthetic resin may be in the form of fibers, and examples thereof include fibers of nylon, polyester, an acrylic resin, vinylon, polyolefin, polyurethane, and rayon.

The synthetic resin may be an elastomer. Examples of a thermosetting elastomer as the elastomer include isoprene rubber (IR), butadiene rubber (BR), styrene-butadiene rubber (SBR), chloroprene rubber (CR), nitrile rubber (NBR), polyisobutyrene rubber or butyl rubber (IIR), ethylene-propylene rubber (EPM, EPDM), chlorosulfonated polyethylene (CSM), acrylic rubber (ACM), and epichlorohydrin rubber (CO, ECO), examples of a thermosetting resin elastomer include a part of urethane rubber (U), silicone rubber (Q), and fluorine rubber (FKM), and examples of a thermoplastic elastomer include styrene, olefin, vinyl chloride, urethane and amide elastomers. Natural rubber (NR), which is included in the compound of the invention, is described as inclusive in the elastomer for convenience of explanation.

Examples of the major applications of the elastomer include a tire for a large automobile, a hose pipe, a belt, and a pneumatic spring for natural rubber (NB) and isoprene rubber (IR); an O ring, an oil seal, a gasket, an oil resistant hose pipe for nitrile rubber (NBR); a tire, shoes, and an antivibration rubber for styrene rubber (SBR); a wire covering, an automobile component, a belt conveyer, a window frame for chloroprene rubber (CR); and a packing, an antivibration material, a medical-related material, and a food-related material for silicone rubber (Q).

Mineral Oil

Examples of the mineral oil include a lubricant oil, a grease, and an oil for mixing in rubber, such as a paraffin mineral oil, a naphthene mineral oil and an aromatic mineral oil.

Organic Solvent

Examples of the organic solvent include non-polar ones, such as hexane, benzene, toluene, chloroform, and ethyl acetate, polar non-protonic ones, such as acetone, N,N-dimethylformamide (DMF), N-methylpyrrolidine (NMP), and acetonitrile, and polar protonic ones, such as acetic acid, ethanol, methanol, water, 1-butanol, 2-propanol, and formic acid.

Graphene

Graphene is excellent in strength, electroconductivity, thermal conductivity, transparency, electrode corrosion resistance, gas barrier property to gas and liquid, and the like, is flexible, and thus may be mixed in various compounds.

Graphene Particles

The graphene in the invention has a scale-like shape and is in the form of flakes having a length of the longer edge that is larger than the thickness. The flakes of the graphene herein desirably have a length of the longer edge that is larger by 5 times or more than the thickness. The graphene in the form of flakes will be described with reference to FIG. 1. FIG. 1 shows the graphene in the form of flakes produced by the production method described later. In FIG. 1, the longer edge of graphene means the part having the maximum length on viewing the cleavage surface from above. The shorter edge means the part having the maximum length in the direction perpendicular to the longer edge. The thickness of the graphene (i.e., the length in the direction perpendicular to the cleavage surface) is based on the thinnest part thereof.

Production Method of Graphene

The production method of the graphene is not particularly limited, and cleavage from graphite is preferred from the standpoint of the productivity. Representative examples of the production method that may be employed include the following: a method of decreasing the pressure of the atmosphere, a method of heating, a method of applying vibration with an ultrasonic wave, a method of applying a plasma under the atmospheric pressure, a method of applying a plasma in vacuum, a method of applying a microwave, a method of making a jet flow collide therewith, and a method using a cavitation effect with a jet flow. At least two methods among these are preferably performed from the standpoint of the productivity and the formation of a thin product. The production may be performed by a wet method or a dry method. In the case using wet method, the dispersant described later may be mixed in graphite as a raw material. Oxidized graphene or reduced graphene may be used, which is obtained by oxidizing or reducing graphene with a chemical treatment with an acid or an alkali, but is not preferably used since the properties of the graphene may be broken through oxidization. It has been found that flakes having a short longer edge may be obtained when graphite is exfoliated with the nonionic dispersant described later added thereto in the production of the graphene.

The graphene used may be in the form of powder or in the form dispersed in a solution. The solution may be one suitable for the compound, and may be any of water, an oil and an organic solvent.

Dispersant

The dispersant may be selected to have properties that are suitable for the compound. Examples of the dispersant include an anionic surfactant, a cationic surfactant, an amphoteric surfactant, and a nonionic surfactant. An anionic surfactant and a nonionic surfactant may be preferably used particularly for graphene. A nonionic surfactant is more preferably used. A nonionic surfactant exhibits hydrophilicity through hydrogen bond to water without ionic dissociation, for example, with an oxyethylene group, a hydroxyl group or a sugar chain such as glucoside, and thus has an advantage that it is usable in a non-polar solvent although it may not have strong hydrophilicity equivalent to an ionic surfactant. Furthermore, the property thereof may be controlled freely from lipophilicity to hydrophilicity by changing the length of the hydrophilic group. Preferred examples of the anionic surfactant include a salt of an X acid (examples of the X acid include cholic acid and deoxycholic acid), such as sodium deoxycholate (SDC), and a phosphate ester. Preferred examples of the nonionic surfactant include a glycerin fatty acid ester, a sorbitan fatty acid ester, a fatty alcohol ethoxylate, a polyoxyethylene alkyl phenyl ether, and an alkyl glycoside.

Graphene Composition

The graphene composition may be obtained by mixing and kneading the compound and the graphene.

In the case where the compound is a synthetic resin, the mixing and kneading operation may be performed with a Henschel mixer, a Banbury mixer, a single screw extruder, a twin screw extruder, a multiple screw extruder, a kneader, and a planetary mixer. For enhancing the dispersibility, preliminary dispersion is preferably performed with a ribbon blender, a drum tumbler, a butterfly mixer, a pony mixer, or the like.

The graphene composition thus obtained may have a formulation containing from 99.98 to 90% by weight of the compound, from 0.01 to 5% by weight of the graphene, and from 0.01 to 5% by weight of the dispersant. When the amount of the graphene is less than 0.01% by weight, the properties, such as the strength, that are obtained with the graphene added thereto may not be sufficiently obtained. When the amount thereof exceeds 5% by weight, the properties inherent to the compound may be adversely affected in some cases. The formulation contains more preferably from 99.98 to 96% by weight of the compound, from 0.01 to 3% by weight of the graphene, and from 0.01 to 3% by weight of the dispersant, and further preferably from 99.98 to 98% by weight of the compound, from 0.01 to 1% by weight of the graphene, and from 0.01 to 1% by weight of the dispersant.

The graphene contains first flakes having a longer edge of less than 1 μm and second flakes having a longer edge of 1 μm or more and less than 5 μm. The number of the first flakes is 5% or more, preferably 40% or more, and more preferably 80% or more, of the entire flakes in the graphene. The number of the first flakes is preferably larger since the graphene may be easily dispersed, and the properties, such as the strength, that are obtained with the graphene added thereto may be enhanced. The total number of the first flakes and the second flakes is 90% or more, preferably 92% or more, and more preferably 99% or more, of the entire flakes in the graphene. This is because other flakes than the first flakes and the second flakes have a larger longer edge and thus are considered to exhibit less function of enhancing the properties, such as the strength, that are obtained with the graphene added thereto.

In the graphene, the number of the second flakes may be 10% or more and less than 60%, and preferably approximately 20%, of the entire flakes in the graphene. This is because the presence of the first flakes and the second flakes mixed with each other may provide a function of facilitating dispersion thereof in the compound (the function will be described later) and may impart the properties provided by the graphene thereto.

The number of the third flakes having a thickness of more than 1.3 nm and 100 nm or less may be more than 60%, and preferably more than 70%, of the entire flakes in the graphene. For example, flakes of 0.3 nm may be less than 20%, flakes of less than 1.3 nm may be less than 40%, and the third flakes of more than 1.3 nm and 100 nm or less may be more than 60%. The number of flakes having a thickness of 100 nm or more is preferably zero. However, this does not inhibit the use of flakes of more than 100 nm in a small amount from the standpoint of simplifying the selection of grain sizes. Furthermore, the number of flakes of 0.3 nm (single layer) may be less than 20%, thereby making the amount thereof larger than the flakes having other thicknesses.

The graphene is fine and is liable to be agglomerated. The graphene is excellent in dispersibility since, in addition to the use of the dispersant, the graphene has a flake shape, the amount of the graphene added is small as described above, and the flakes have a small longer edge as described above. As a result, the graphene composition is excellent in such properties as the tensile strength. The dispersibility may be confirmed, for example, by observing the distribution of the graphene on the cross section with a scanning electron microscope, or by observing the light transmissibility of the molded article described later.

In the case where the graphene composition is used as an intermediate composition, the dispersibility is an important factor since a final composition is often obtained by diluting the intermediate composition.

The graphene may be mixed with a synthetic resin to form pellets and used as a master batch. The master batch means a material in the form of pellets containing a dye, a pigment or a functional material added in a high concentration to a resin base. The pellet form may facilitate dispersion of the graphene in a synthetic resin as a base, and may be improved in handleability, for example, the pellets may not contaminate equipments, may not fly, may be easily stored, and may be easily weighed.

In the case where the compound is an organic solvent or a synthetic oil, the graphene and a nonionic surfactant may be added to and mixed with an organic solvent or a synthetic oil.

Figure 2:
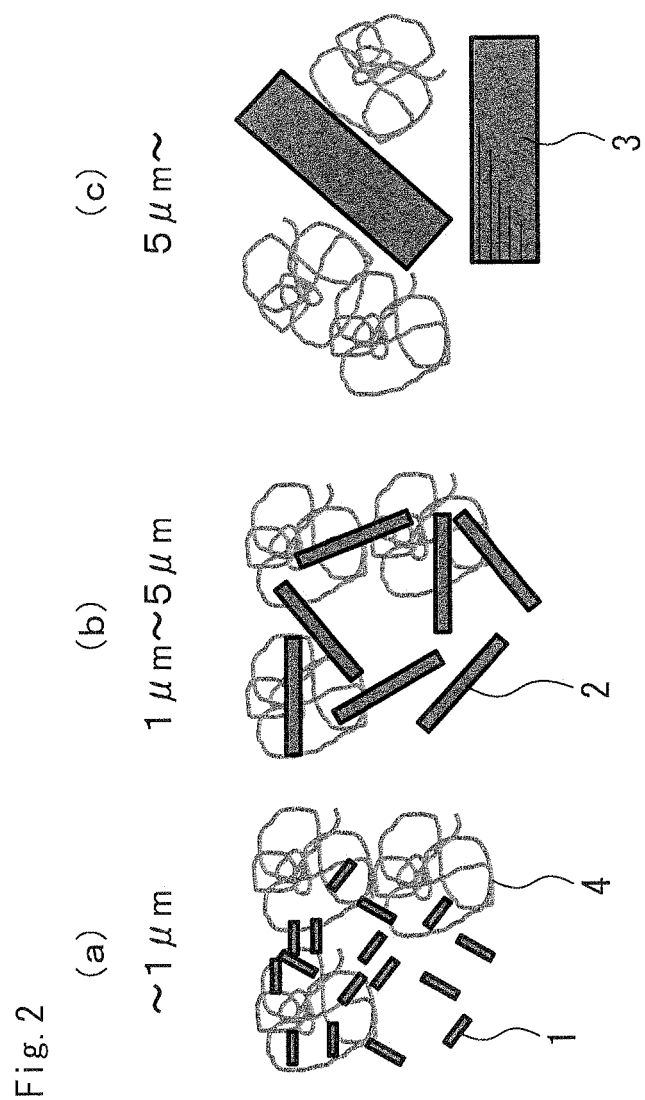
FIG. 2 is illustrative diagrams (a), (b) and (c) for describing a dispersed state of graphene in a polymer.
Figure 3:
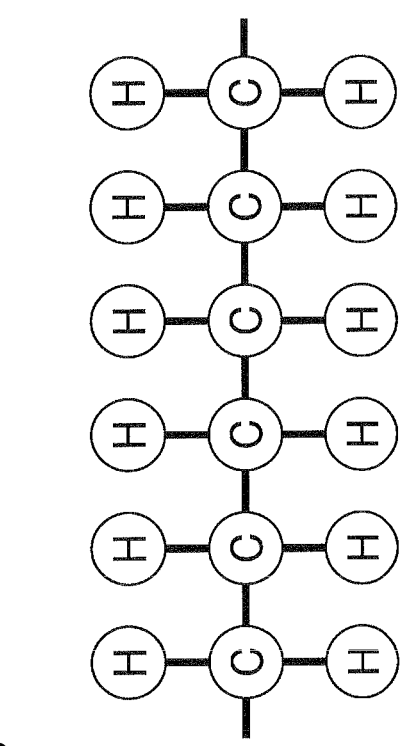
FIG. 3 is a diagram showing a structure of polyethylene.

It is considered that the compound is particularly effective when the compound is a polymer material having a molecular weight of from 10,000 to 1,000,000, and preferably from 20,000 to 300,000. FIG. 3 shows an example of a structure of a polyethylene polymer, which is actually formed of polymers in a tangled form (which are hereinafter referred to as tangled polymers 4) entangled with each other as shown in FIG. 2. In the case where the molecular weight is from 10,000 to 1,000,000, the tangled polymer 4 is estimated to have a size of approximately from 2 to 3 μm.

As shown in FIG. 2 (a), the flakes 1 having a longer edge of less than 1 μm (i.e., the first flakes) intervene into the interspaces of the tangled polymer 4 and encompassed in the tangled polymer 4, and thus it is considered that the flakes 1 have a large effect of enhancing the properties, such as the strength, by mixing the graphene. As shown in FIG. 2(b), the flakes 2 having a longer edge of 1 μm or more and less than 5 μm (i.e., the second flakes) has a size that is equivalent to the outer shape of the tangled polymers 4, and thus it is considered that the flakes 2 connect the plural tangled polymers 4 to enhance the bonding strength of the tangled polymers 4. As shown in FIG. 2(c), flakes 3 having a longer edge of 5 μm or more is larger than the outer shape of the tangled polymers 4, and thus it is considered that the flakes 3 have a small effect of connecting the tangled polymers 4. For achieving the effects of the flakes 1 and the flakes 2, it is considered that the length of the longer edge is preferably larger by 5 times or more than the thickness. In this case, the number of flakes having a thickness of more than 1.3 nm and 100 nm or less is desirably 60% or more of the entire flakes in the graphene.

When the content of the flakes in an organic compound is too large, it is considered that the flakes may be disturbances among the tangled polymers 4, and thus it is considered the flakes have a small effect of enhancing the strength and the like. For providing the properties, such as the strength, with a small amount of flakes, it is considered that the state shown in FIG. 2 (a) where the flakes 1 intervene into the tangled polymers 4 and the state shown in FIG. 2 (b) where the flakes 2 connect the plural tangled polymers 4 preferably coexist. In the case where the states coexist, the graphene preferably contains flakes that satisfy the following conditions: the longer edge of the flakes 1 is shorter than the outer shape of the tangled polymers 4, and preferably is from 1/10 to 1/2 of the outer shape of the tangled polymers 4, and the longer edge of the flakes 2 is longer by several times than the outer shape of the tangled polymers 4, and preferably longer by from 2 to 5 times than the outer shape of the tangled polymers 4. It is considered that the effect of the state shown in FIG. 2 (a) where the flakes 1 intervene into the tangled polymers 4 is larger, and thus it is considered that the proportion of the first flakes is preferably larger.

The graphene composition may be used as an intermediate composition. Specifically, the graphene composition described above as an intermediate composition may be mixed in and diluted with a base composition to provide a graphene composition as a final product. The compound in the base composition and the compound in the intermediate composition may be the same as or different from each other. Naturally, the compound described above, the graphene and the dispersant may also be directly mixed with each other to produce various products without using the graphene intermediate composition. The use of the graphene intermediate composition may facilitate the dispersion and the handleability of the graphene.

EXAMPLES

The invention will be described with reference to examples, but is not limited to the examples. In Examples 1 to 8 shown below, graphene compositions were produced with variation of the mixing ratio of the first flakes and the second flakes of the graphene, the amount of the graphene added, and the compound as a base, and the resulting graphene compositions were observed for the grain size distribution of graphene and measured for the tensile strength, the elongation, and the piercing strength or the elastic modulus of films formed by molding the graphene compositions.

The grain size distribution of graphene (i.e., the distribution of the length of the longer edge thereof) was obtained by measuring a graphene dispersion liquid of graphene in the form of flakes after production with a laser scattering measuring equipment (Examples 1 and 4 to 8: PRAR-1000, produced by Otsuka Electronics Co., Ltd., Examples 2 and 3: LA 960, produced by Horiba, Ltd.). In the measurement, the length of the longer edge of the flakes corresponds to the particle diameter.

The tensile strength and the elongation of the film was measured and evaluated with a desktop precision universal tester (Autograph AGS-J), produced by Shimadzu Corporation, at a test speed of 500 mm/min.

The piercing strength of the film was measured and evaluated with a desktop precision universal tester (Autograph AGS-J), produced by Shimadzu Corporation, at a test speed of 50 mm/min.

For epoxy resins and polystyrene, the tensile strength and the Young's ratio were measured and evaluated according to ASTM D638.

Example 1

Production of Graphene

Graphene was produced in such a manner that an operation of making graphite (1 kg) (flaky graphite, produced by Nippon Graphite Industries, Ltd.) collide with a collision plate along with a gas jet flow was repeated 10 times, and the thus-treated graphene (1 kg) and a nonionic surfactant (50 g) as a dispersant were placed in water (3.95 kg), to which vibration was applied with an ultrasonic wave for 10 hours to exfoliate further graphene, so as to make a dispersion liquid of graphene of 20% by weight. In this case, the graphene may be produced by the various methods described above, and the exfoliation process may be performed to make at least the total number of the first flakes having a longer edge of less than 1 μm and the second flakes having a longer edge of 1 μm or more and less than 5 μm be 90% or more of the entire flakes contained in the graphene. At this time, flakes that are larger than the second flakes may be removed by filtration.

Grain Size Distribution of Graphene

Figure 4:
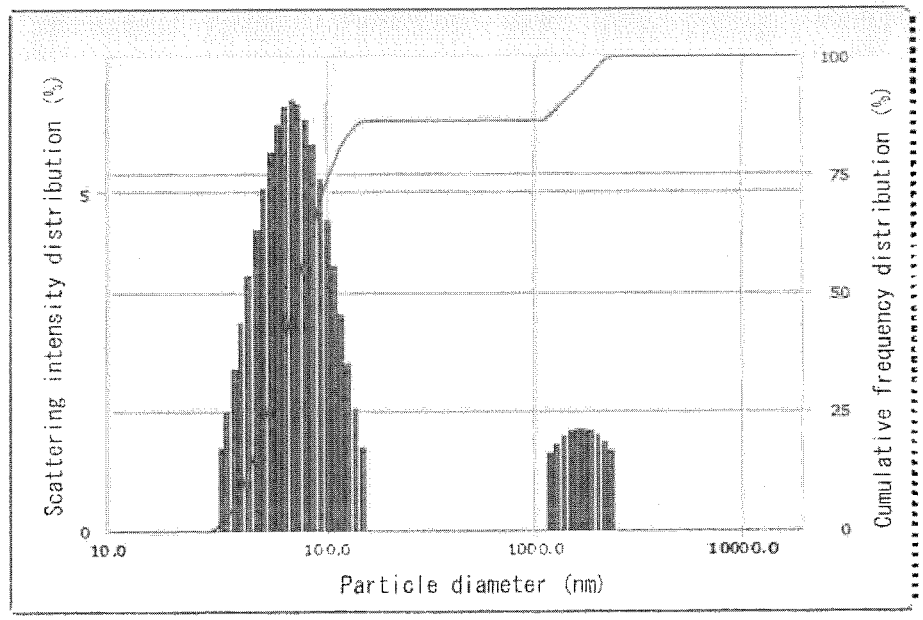
FIG. 4 is a diagram showing the grain size distribution of graphene in Examples 1, 4 and 5.

FIG. 4 is a diagram showing the grain size distribution of graphene (i.e., the distribution of the length of the longer edge of the flakes in the graphene dispersion liquid) in Example 1. In consideration of FIG. 4, the grain size distribution of the graphene had two peaks, i.e., a peak at approximately 80 nm in the range of approximately from 40 to 120 nm and a peak at approximately 1.15 μm in the range of approximately from 1.1 to 1.2 μm.

The proportion in the total number of the flakes was 80% for the first flakes having a longer edge of less than 1 μm and 20% for the second flakes having a longer edge of 1 μm or more and less than 5 μm.

Thickness of Graphene

As a result of observation of the number of flakes with a scanning electron micrograph for the thickness of the graphene, flakes of 0.3 nm was several percent, flakes of 0.6 nm or more and less than 1.3 nm was approximately 30%, and flakes of more than 1.3 nm and 100 nm or less was more than 60%. Furthermore, the proportion of flakes having a length of the longer edge of the cleavage surface that was larger by approximately from 50 to 3,000 times than the smallest thickness of the flakes was 70%. The proportion of flakes having a length of the longer edge of the cleavage surface that was larger by from 30 to 10,000 times than the smallest thickness of the flakes was 70%.

Molded Article (1) The graphene dispersion liquid was mixed and agitated to make 2% by weight of the graphene and 0.1% by weight of the nonionic surfactant be contained in 97.9% by weight of linear low density polyethylene (LLDPE: NUCG-5225, produced by Nippon Unicar Co., Ltd.), and a master batch (graphene intermediate composition) was produced with a twin screw extruder (twin screw extruder, HK25D, produced by Berstorf AG). The nonionic surfactant was one that had been added in the production of the graphene but was not newly added in the production of the master batch.

(2) The master batch was then mixed and diluted with low density polyethylene (LDPE: NUC-8323, produced by Nippon Unicar Co., Ltd.) to make the graphene be 0.1% by weight or 0.04% by weight.

(3) A film having a thickness of 30 μm was then produced by inflation molding.

Evaluation

As shown in Table 1, a graphene-free film had a tensile strength of 27.4 MPa. On the other hand, the films having the graphene added thereto in an amount of 0.04% by weight and 0.1% by weight had a tensile strength of 30.7 MPa and 35.1 MPa, respectively, which were improved by 12% and 28% from the graphene free film.

The elongation and the piercing strength were also improved from the graphene-free film.

TABLE 1

|  | Amount of graphene added | | |
| --- | --- | --- | --- |
|  | 0% (graphene-free) | 0.04% by weight | 0.1% by weight |
| Tensile strength (MPa) | 27.4 | 30.7 | 35.1 |
| (comparison to graphene-free film) | (—) | (+12%) | (+28%) |
| Elongation (%) | 480 | 370 | 250 |
| Piercing strength (N) | 0.94 | 1.06 | 1.08 |

Example 2

In Example 2, graphene was produced by using an anionic surfactant (SDC: sodium deoxycholate, produced by Wako Pure Chemical Industries, Ltd.), which was ordinarily used for dispersing graphene, and the other procedures were the same as in Example 1. Only the difference will be described.

Figure 5:
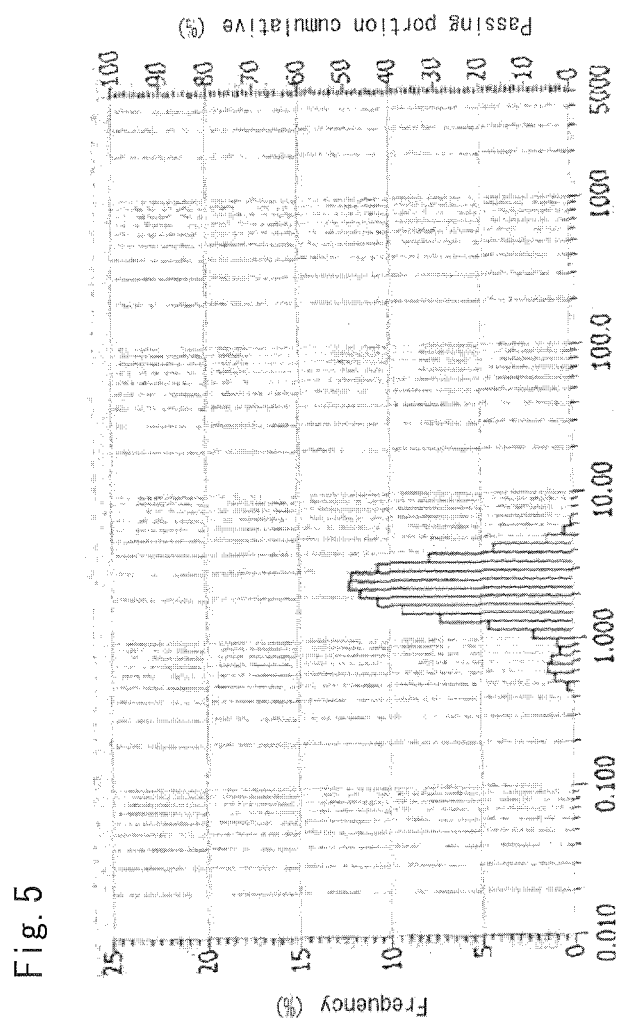
FIG. 5 is a diagram showing the grain size distribution of graphene in Example 2.

In consideration of FIG. 5, the grain size distribution of the graphene had two peaks, i.e., a peak at approximately 550 nm in the range of approximately from 400 to 900 nm and a peak at approximately 2.5 μm in the range of approximately from 700 nm to 7 μm.

The proportion in the total number of the flakes was 5% for the first flakes having a longer edge of less than 1 μm, 93% for the second flakes having a longer edge of 1 μm or more and less than 5 μm, and 2% for the other flakes of 5 μm or more.

Evaluation

As shown in Table 2, a graphene-free film had a tensile strength of 27.3 MPa. On the other hand, the films having the graphene added thereto in an amount of 0.04% by weight and 0.1% by weight had a tensile strength of 28.7 MPa and 30.5 MPa, respectively, which were improved by 5% and 12% from the graphene-free film, respectively.

The elongation and the piercing strength were also improved from the graphene-free film.

TABLE 2

| | Amount of graphene added | | |
|---|---|---|---|
| | 0% (graphene-free) | 0.04% by weight | 0.1% by weight |
| Tensile strength (MPa) (comparison to graphene-free film) | 27.3 (—) | 28.7 (+5%) | 30.5 (+12%) |
| Elongation (%) | 470 | 450 | 380 |
| Piercing strength (N) | 0.95 | 0.97 | 1.00 |

Example 3

In Example 3, graphene was produced in the same manner as in Example 1 except that the period of time for applying an ultrasonic wave in the production of the graphene was as short as 1 hour to provide a different grain size distribution of the graphene. Only the difference will be described.

Figure 6:
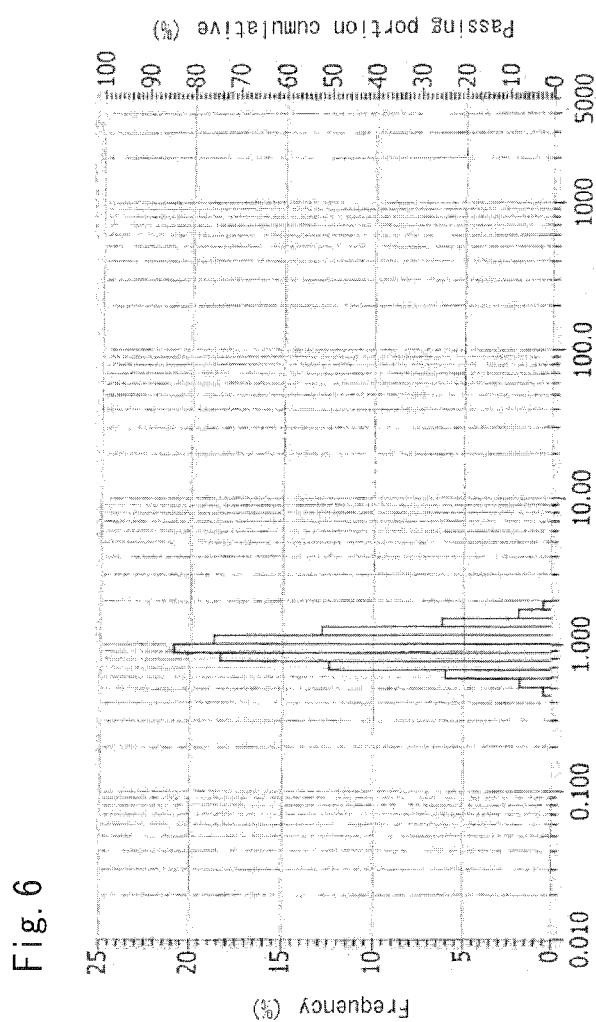
FIG. 6 is a diagram showing the grain size distribution of graphene in Example 3.

In consideration of FIG. 6, the grain size distribution of the graphene had a peak at approximately 950 nm in the range of approximately from 400 nm to 2 μm.

The proportion in the total number of the flakes was 40% for the first flakes having a longer edge of less than 1 μm, and 60% for the second flakes having a longer edge of 1 μm or more and less than 5 μm.

Evaluation

As shown in Table 3, a graphene-free film had a tensile strength of 27.6 MPa. On the other hand, the films having the graphene added thereto in an amount of 0.04% by weight and 0.1% by weight had a tensile strength of 30.0 MPa and 33.1 MPa, respectively, which were improved by 9% and 20% from the graphene-free film, respectively.

The elongation and the piercing strength were also improved from the graphene-free film.

TABLE 3

| | Amount of graphene added | | |
|---|---|---|---|
| | 0% (graphene-free) | 0.04% by weight | 0.1% by weight |
| Tensile strength (MPa) (comparison to graphene-free film) | 27.6 (—) | 30.0 (+9%) | 33.1 (+20%) |
| Elongation (%) | 480 | 420 | 360 |
| Piercing strength (N) | 0.98 | 1.07 | 1.08 |

Example 4

Example 4 was different from Example 1 in the point that the organic compound was an epoxy resin. The grain size distribution was the same as in FIG. 4 for Example 1, the description of which was omitted herein.

The graphene was mixed with an epoxy resin (EPON828, produced by Miller Stephenson Chemical Co., Inc.) to make the graphene be 0.1% by weight or 0.04% by weight, and the mixture was cast in a mold and cured for 3 days at ordinary temperature to provide a test specimen (ASTM D638).

Evaluation

As shown in Table 4, a graphene-free test piece having no graphene added thereto had a tensile strength of 55.2 MPa. On the other hand, the test pieces having the graphene added thereto in an amount of 0.04% by weight and 0.1% by weight had a tensile strength of 63.7 MPa and 74.8 MPa, respectively, which were improved by 15% and 36% from the graphene-free test piece, respectively.

The elastic modulus (Young's ratio) was also improved from the graphene-free test piece.

TABLE 4

| | Amount of graphene added | | |
|---|---|---|---|
| | 0% (graphene-free) | 0.04% by weight | 0.1% by weight |
| Tensile strength (MPa) (comparison to graphene-free test piece) | 55.2 (—) | 63.7 (+15%) | 74.8 (+36%) |
| Young's ratio (GPa) | 2.8 | 3.2 | 3.8 |

Example 5

Example 5 was different from Example 1 in the point that the organic compound was general purpose polystyrene (GPPS). The grain size distribution was the same as in FIG. 4 for Example 1, the description of which was omitted herein.

The graphene was mixed with general purpose polystyrene (GPPS: G100C, produced by Toyo Styrene Co., Ltd.) to make the graphene be 0.1% by weight or 0.04% by weight, and the mixture was injection-molded to provide a test specimen (ASTM D638).

Evaluation

As shown in Table 5, a graphene-free test piece had a tensile strength of 37.8 MPa. On the other hand, the test pieces having the graphene added thereto in an amount of 0.04% by weight and 0.1% by weight had a tensile strength of 41.9 MPa and 47.3 MPa, respectively, which were improved by 11% and 25% from the graphene-free test piece, respectively.

The elastic modulus (Young's ratio) was also improved from the graphene-free test piece.

TABLE 5

|  | Amount of graphene added | | |
| --- | --- | --- | --- |
|  | 0% (graphene-free) | 0.04% by weight | 0.1% by weight |
| Tensile strength (MPa) (comparison to graphene-free test piece) | 37.8 (—) | 41.9 (+11%) | 47.3 (+25%) |
| Young's ratio (GPa) | 2.3 | 2.5 | 3.0 |

Example 6

Example 6 was the same as Example 1 except that the grain size distribution of the graphene was changed. Only the difference will be described.

Figure 7:
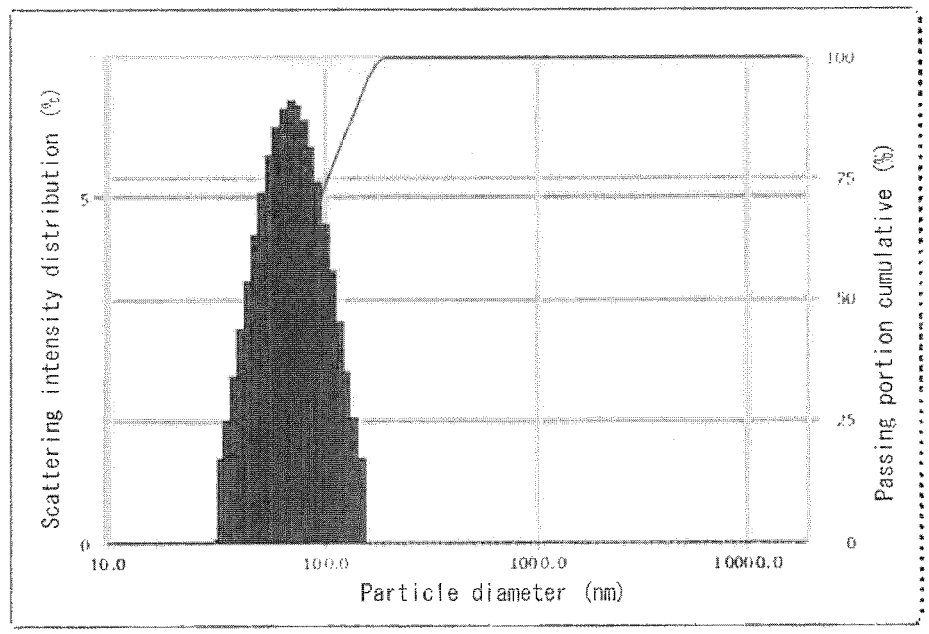
FIG. 7 is a diagram showing the grain size distribution of graphene in Example 6.

In consideration of FIG. 7, the grain size distribution of the graphene had a peak at approximately 80 nm in the range of approximately from 40 to 120 nm. As a result of observation with a scanning electron microscope, only a slight amount (less than 1%) of the second flakes of 1 μm or more and less than 5 μm were observed. This was because the second flakes were removed by filtration after the production of the graphene dispersion liquid used in Example 1.

Evaluation

As shown in Table 6, a graphene-free film had a tensile strength of 27.4 MPa. On the other hand, the films having the graphene added thereto in an amount of 0.04% by weight and 0.1% by weight had a tensile strength of 31.2 MPa and 35.4 MPa, respectively, which were improved by 14% and 29% from the graphene-free film, respectively.

The specimen having a content of the graphene of 0.1% by weight was equivalent to Example 1 (with the difference in improvement of 1%). This means that there is a significance in the coexistence of the second flakes in the proportion of 0.1% by weight.

The elongation and the piercing strength were also improved from the graphene-free film. The piercing strength was equivalent to Example 1, and thus there was no significant difference in the ratio of the first flakes and the second flakes.

TABLE 6

|  | LDPE | | |
| --- | --- | --- | --- |
|  | Amount of graphene added | | |
|  | 0% (graphene-free) | 0.04% by weight | 0.1% by weight |
| Tensile strength (MPa) (comparison to graphene-free film) | 27.4 (—) | 31.2 (+14%) | 35.4 (+29%) |
| Elongation (%) | 480 | 350 | 240 |
| Piercing strength (N) | 0.94 | 1.06 | 1.08 |

Example 7

In Example 7, the final shape of the molded article was a test piece 5 having a thickness of 4 mm obtained by injection molding. Example 7 was different in this point from Example 1 where the final shape was a film. The other procedures were the same as Example 1 (the graphene and the resin were the same), the description of which was omitted herein.

Figure 8:
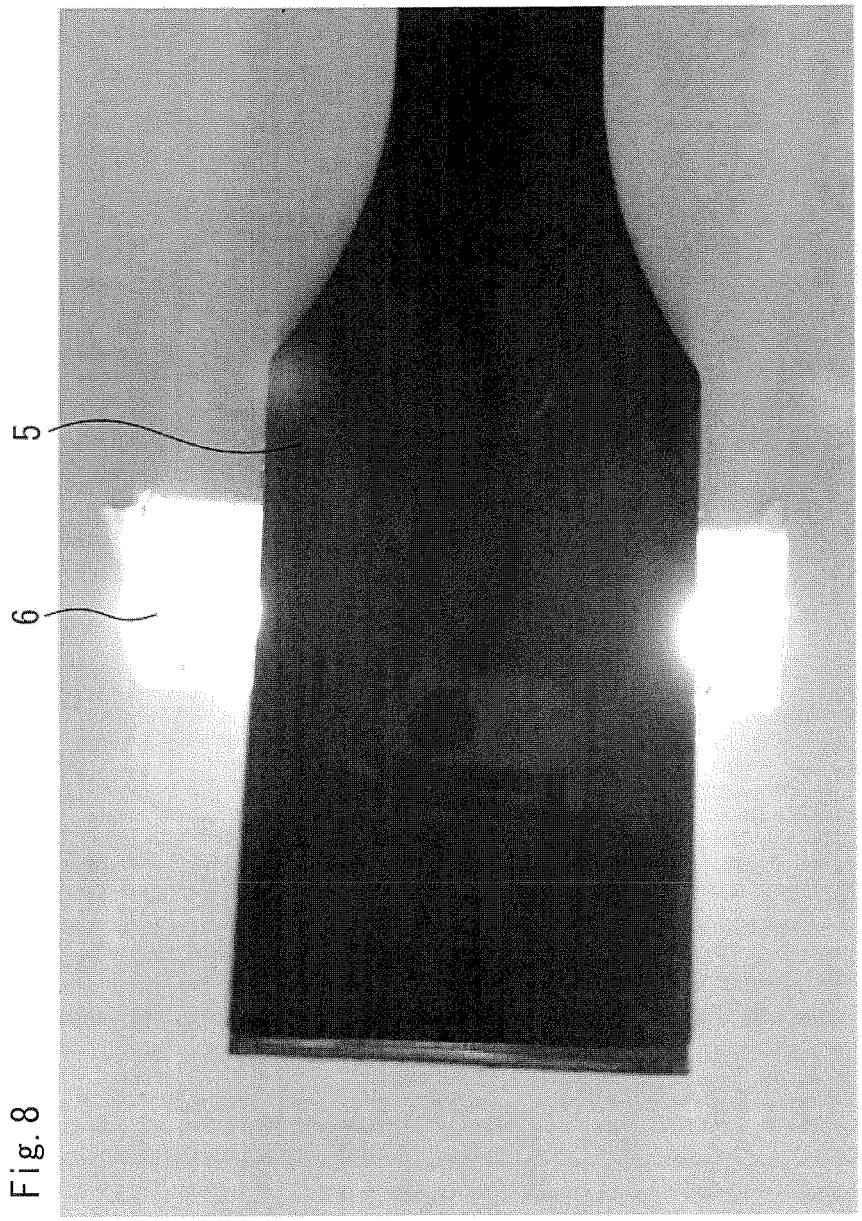
FIG. 8 is an image obtained by imaging the molded article irradiated with light from below in Example 7.

FIG. 8 shows observation from above of the test piece 5 irradiated with light from below with an LED light source, and as a result of the observation, the light from the LED light source was shielded. In this case, it is considered that the light from the LED light source is shielded with the graphene dispersed since the graphene has high dispersibility and is suitably dispersed in the compound.

Example 8

In Example 8, the final shape of the molded article was a test piece 5 having a thickness of 4 mm obtained by injection molding. Example 8 was different in this point from Example 2 where the final shape was a film. The other procedures were the same as Example 2 (the graphene and the resin were the same), the description of which was omitted herein.

FIG. 9 shows observation from above of the test piece 5 irradiated with light from below with an LED light source, and as a result of the observation, the light from the LED light source was partially transmitted. In Example 8, it is considered that the light from the LED light source is partially transmitted since the graphene has low dispersibility due to the different dispersant from Example 7.

As a result of comprehensive observation in Examples 7 and 8, the test piece of Example 7 shields light (FIG. 8), whereas the test piece of Example 8 partially transmits light (FIG. 9). It is known that graphene shields 2.3% of light per one layer (in other words, transmits 97.7% of light). The test piece having a thickness of 4 mm contains 0.1% by weight of graphene, and thus it is assumed that 4 μm of graphene, i.e., 12,000 layers, is present in the thickness direction. It is considered that the number of layers may be approximately 1,000 since the directions thereof are not actually arranged, and it is understood that 1,000 layers of graphene may not transmit light since 1,000-th power of 0.977 is $7.8 \times 10^{-11}$%. Consequently, it is considered that this is because the test piece of Example 8 contains graphene that is agglomerated but is not dispersed, as compared to the test piece of Example 7. It is expected therefrom that the molded article of Example 1 has a larger tensile strength than the molded article of Example 2. Examples 7 and 8 have the same conditions except for the dispersant, and thus it is found that the use of a nonionic surfactant as the dispersant provides a small grain size distribution and excellent dispersibility for the graphene.

According to the examples described above, the use of the flakes having different sizes, i.e., the first flakes having a longer edge of less than 1 μm and the second flakes having a longer edge of 1 μm or more and less than 5 μm, enhances the bond to the compound, and imparts the properties due to the graphene to the compound without impairing the properties inherent to the compound. In this case, even when the amount of the graphene is as small as from 0.01 to 5% by weight with respect to the graphene composition, the strength and the electroconductivity may be enhanced for the properties of the compound. The number of the first flakes is preferably 5% or more of the entire flakes in the graphene, in view of Example 2. The total number of the first flakes and the second flakes is preferably 90% or more of the entire flakes in the graphene, and is preferably 98% or more thereof in view of Example 2. In this case, the total number of the first flakes and the second flakes may be increased by prolonging the processing time for exfoliating the graphene by applying vibration with an ultrasonic wave, and thus the ratio of the content of the first flakes and the second flakes with respect to the entire flakes in the graphene may be controlled by changing the processing time with an ultrasonic wave.

As a result of comprehensive observation in Examples 1 to 3, the tensile strength may be further enhanced when the number of the first flakes is larger than the number of the second flakes. In this case, the number of the first flakes may be made larger than the number of the second flakes by removing the second flakes by filtration.

With respect to the thickness of the first flakes and the second flakes, the observation in Example 1 reveals that the number of flakes of 0.3 nm is several percent, the number of flakes of 0.6 nm or more and less than 1.3 nm is approximately 30%, and the number of flakes of more than 1.3 nm and less than 100 nm is more than 60%, and thus the number of flakes of more than 1.3 nm and less than 100 nm is preferably larger than 60%.

The examples of the invention have been described with reference to the drawings, but the specific constitutions of the invention are not limited to the examples, and modifications and additions that are in a range without deviation from the substance of the invention are encompassed by the invention.

For example, the mixing ratio of the first flakes having a longer edge of less than 1 μm and the second flakes having a longer edge of 1 μm or more and less than 5 μm may be other ratios than those in the examples above when the total number of the first flakes and the second flakes is 90% or more of the entire flakes in the graphene.

REFERENCE SIGNS LIST

1 flake having longer edge of less than 1 μm
2 flake having longer edge of 1 μm or more and less than 5 μm
3 flake having longer edge of 5 μm or more
4 tangled polymer
5 test piece
6 LED light source

The invention claimed is:

1. A graphene composition comprising a compound, a graphene, and a dispersant,
    the graphene being contained in an amount of from 0.01 to 5% by weight and containing first flakes having a longer edge of less than 1 μm and second flakes having a longer edge of 1 μm or more and less than 5 μm, a number of the first flakes being 5% or more of the entire flakes in the graphene, a total number of the first flakes and the second flakes being 90% or more of the entire flakes in the graphene, 60% or more of the entire flakes in the graphene having a thickness of more than 1.3 nm and having a thickness of 100 nm or less,
    the compound being polymers having an average molecular weight of from 10,000 to 1,000,000, wherein
    the first flakes intervening into interspaces of the polymers, the second flakes connecting the polymers to each other.

2. The graphene composition according to claim 1, wherein the dispersant is a nonionic surfactant.

3. The graphene composition according to claim 1, wherein the dispersant is a compound having a glycerine fatty acid ester structure.

4. The graphene composition according to claim 1, wherein in the graphene, the number of the first flakes is larger than the number of second flakes.

5. The graphene composition according to claim 1, wherein the graphene is contained in an amount of less than 0.1 by weight.

6. A graphene molded article comprising the graphene composition according to claim 1 having been molded.

7. A graphene molded article comprising the graphene composition according to claim 2 having been molded.

8. A graphene molded article comprising the graphene composition according to claim 3 having been molded.

9. A graphene molded article comprising the graphene composition according to claim 4 having been molded.

* * * * *